United States Patent
Grossblatt et al.

(10) Patent No.: US 8,060,403 B1
(45) Date of Patent: Nov. 15, 2011

(54) METHOD AND SYSTEM FOR PROVIDING ADVERTISING TO SELECT CONSUMERS USING PAYROLL DATA AND SYSTEMS

(75) Inventors: Lesley Kim Grossblatt, San Francisco, CA (US); David S. Park, San Francisco, CA (US); Elizabeth C. Douglas, Mountain View, CA (US); Albert Joongkyu Ko, Menlo Park, CA (US); José Mariano Resendiz, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 652 days.

(21) Appl. No.: 12/182,348

(22) Filed: Jul. 30, 2008

(51) Int. Cl.
*G06Q 40/00* (2006.01)
(52) U.S. Cl. ............................ 705/14; 705/35
(58) Field of Classification Search .................. 705/14, 705/35
See application file for complete search history.

(56) References Cited

U.S. PATENT DOCUMENTS

2006/0111990 A1* 5/2006 Cohen et al. .................... 705/32
2006/0212354 A1* 9/2006 Wolf et al. ...................... 705/14

* cited by examiner

Primary Examiner — Thu Thao Havan
(74) Attorney, Agent, or Firm — Gunnison, McKay & Hodgson, L.L.P.; Philip McKay

(57) ABSTRACT

In accordance with one embodiment, a system and method for providing advertising to select consumers using payroll data includes a process for providing advertising to select consumers using payroll data whereby one or more advertisements and/or marketing devices are distributed to a given consumer based, at least in part, on data representing financial information about the given consumer obtained from a payroll system and/or payroll service. The one or more advertisements and/or marketing devices are distributed to the given consumer through the payroll system and/or payroll service and, in some instances; the one or more advertisements and/or marketing devices are distributed to the given consumer as printed and/or electronic attachments to the given consumer's paycheck and/or payroll account.

28 Claims, 3 Drawing Sheets

300

Send my advertisement to:   301

303   Up to [1 Million, consumers or 10 Million impressions]

305   Who have accrued vacation of:

[40 hours OR MORE]

313   Here's my ad (500 characters max):   311

20% off all Hawaii vacations

Here's my logo   [Upload logo]
(optional):   321

FIG.3

METHOD AND SYSTEM FOR PROVIDING ADVERTISING TO SELECT CONSUMERS USING PAYROLL DATA AND SYSTEMS

BACKGROUND

Advertising and marketing of products and/or services is one of the largest industries in the world. One important, and often expensive, component of many advertising/marketing campaigns is the creation, and distribution, of advertisements and marketing devices such as, but not limited to: printed and/or digital media advertisements; web-site based advertisements and/or coupons; discount certificates; price guarantees; package/upgrade vouchers; group discount vouchers; multiple "for the price of one" offers/vouchers; and or any other advertisement and/or marketing device designed to encourage some form of consumer action and/or inaction.

Traditionally, some advertisements and/or marketing devices have been distributed in "hard-copy", typically printed, form by various means, including, but not limited to: by mail; in newspapers; in magazines; in flyers and inserts; at store front and/or product displays; and/or as attachments to store receipts (i.e., printed on the back of a receipt or appended to a receipt). More recently, electronic media based advertisements and/or marketing devices have been offered/distributed using electronic means such as, but not limited to: networks of computing systems, including public networks such as the Internet; through and/or on web-sites; by e-mail; as electronic attachments to electronic receipts; and as electronic attachments to transactional data, such as, but not limited to, transactional data from and/or displayed by, banks, credit card companies, and other financial institutions.

Advertisements and/or marketing devices, such as those displayed on web-sites, provided in printed media, displayed on television, and/or as distributed through the mail, are most effective, and often only effective, if the advertisements and/or marketing devices are displayed and/or distributed to the largest number of viewers. In addition, in many cases, it is important that a given advertisement and/or marketing device be viewed by the largest number of viewers multiple times, i.e., a given viewer should be exposed to the advertisements and/or marketing devices at least a determined minimum number of times and typically as many times as possible. As noted above, the result is that to try and achieve this desired/required number of "impressions" to the right viewers, the advertisements and/or marketing devices themselves, as well as the advertisement and/or marketing device distribution means, can represent a significant expense to the advertisement and/or marketing device provider.

Typically, the advertisement and/or marketing device providers are willing to incur this expense to meet various, and often specific, marketing goals, including, but not limited to: induce customers to purchase a specific item or service; to help build up a customer base; to get consumers into a store; to retain customers who find a lower price for an item from a competitor; to lure customers away from a competitor; and/or to help clear excess inventory and/or to boost sales of a given product.

However, for many advertisement and/or marketing device providers, especially advertisement and/or marketing device providers using digital and/or on-line advertising, it is very difficult to reach the required number of desirable viewers, and provide the number of desirable viewers the desired number of impressions, in order to justify the advertisement and/or marketing device creation and/or distribution costs.

For instance, using current methods of "targeting" desirable viewers, digital and/or on-line advertisement and/or marketing device providers often rely on typically unverifiable demographic information, e.g., the consumers' self-reported age, sex, and/or income information. In other cases, the advertisement and/or marketing device providers attempt to target specific consumers by relying on information about the content contained within the hosting website, e.g., they may provide advertisements and/or marketing devices related to children's products on parenting-related web-sites. However, this targeting data is very speculative and unreliable, at best. Consequently, using current methods, advertisement and/or marketing device providers often pay for impressions of their advertisement and/or marketing device made to consumers who are not interested, or for whom the subject of the advertisement and/or marketing device is simply not relevant.

In an attempt to more efficiently use their marketing and/or advertising resources, sellers of products and/or services, and other providers of advertisements and/or market devices, often wish to provide their advertisements and/or marketing devices only to consumers who have specific attributes that are particularly desirable to the seller.

As one example, a seller may be particularly interested in targeting consumers who have a specific income. As a more specific example, a seller of high end products and/or services may be interested in targeting select consumers who have a threshold income, for instance an annual income if $100,000.00 or more. In these instances, the seller may wish to avoid "wasting" their advertising resources on lower income consumers who would not be likely to use their product and/or service. In other instances, a seller may provide products and/or services that are typically not of interest to higher income consumers, for instance pawn shops or sub-prime lenders. In these instances, the seller may wish to target select consumers who have lower incomes and not "waste" their advertising resources on higher income consumers who would not be likely to use their product and/or service.

As another example, a seller may be particularly interested in targeting consumers who have a family. As a more specific example, a seller of child-related products and/or services may be interested in targeting select consumers who have at least one dependent. In these instances, the seller may wish to avoid "wasting" their advertising resources on consumers who do not have any children.

Similar to the desires of the advertisement and/or marketing device providers, most consumers would also prefer to receive advertisements and/or marketing devices that are relevant to the consumer, i.e., that are of use to the consumer and/or are directed to products and/or services the consumer uses, or that the consumer may be planning to use in the future.

Despite the desire of sellers, and other providers of advertisements and/or marketing devices, as well as consumers, to create a better system for reaching desirable consumers, there currently is often no information, or limited information, available to the sellers, and other providers of advertisements and/or marketing devices, about a given consumer to enable the sellers, and other providers of advertisements and/or marketing devices, to accurately identify the consumer as a desirable, and/or preferred, customer.

SUMMARY

In accordance with one embodiment, a system and method for providing advertising to select consumers using payroll data includes a process for providing advertising to select consumers using payroll data whereby one or more advertisements and/or marketing devices are distributed to a given consumer based, at least in part, on data representing financial information about the given consumer obtained from a payroll system and/or payroll service. In one embodiment, a given consumer having one or more defined attributes as determined from their payroll data is identified and access to the given consumer is provided to one or more advertisement and/or marketing device providers. In one embodiment, the one or more advertisements and/or marketing devices are distributed to the given consumer through the payroll system and/or payroll service and, in one embodiment, the one or more advertisements and/or marketing devices are distributed to the given consumer as printed and/or electronic attachments to the given consumer's paycheck and/or payroll account.

In one embodiment, an advertisement and/or marketing device provider defines at least one advertisement eligibility criterion that must be met by a consumer in order for the consumer to be eligible to receive one or more advertisements and/or marketing devices. In one embodiment, the advertisement and/or marketing device provider defines the at least one advertisement eligibility criterion in order to target select consumers having characteristics the advertisement and/or marketing device provider finds particularly desirable. For instance, in one embodiment, the advertisement and/or marketing device provider criteria can include, but are not limited to: consumers who have a threshold or cutoff income; consumers having a threshold amount of vacation time accrued; consumers having recently received a bonus or pay raise; consumers having recently changed their dependent based tax withholdings, thereby indicating a marriage or child; consumers living within a defined distance of the advertisements and/or marketing device provider; consumers who have a threshold number of dependents; consumer's having, or not having, various forms of insurance; consumer's having flex spending and threshold balances in their flex spending accounts; consumers who meet various economic and social demographics; and/or any other criteria considered desirable by an advertisement and/or marketing device provider and/or available through payroll data.

In one embodiment, the advertisement and/or marketing device provider provides the at least one advertisement eligibility criterion to the process for providing advertising to select consumers using payroll data via a user interface displayed on a computing system, as defined herein, and a user interface device, such as defined herein, and/or known in the art at the time of filing, and/or as developed thereafter.

In one embodiment, access to the data representing the at least one advertisement eligibility criterion is then provided to the process for providing advertising to select consumers using payroll data, either directly or through a computing system implemented data management system that implements, includes, is accessible by, and/or is otherwise associated with the process for providing advertising to select consumers using payroll data.

In one embodiment, the advertisement and/or marketing device provider provides advertisement and/or marketing device offer data including, but not limited to, the terms of the advertisement and/or marketing device, contact information for the advertisement and/or marketing device provider, and, optionally, a logo and/or trademark associated with the advertisement and/or marketing device provider, to process for providing advertising to select consumers using payroll data. In one embodiment, the advertisement and/or marketing device provider provides advertisement and/or marketing device offer data via a user interface displayed on a computing system and a user interface device, such as defined herein, and/or known in the art at the time of filing, and/or as developed thereafter.

In one embodiment, the given advertisement and/or marketing device can be, but is not limited to: a printed advertisement; a digital media advertisement, such as an advertisement displayed on a web-site or attached to e-mail or a text message; a coupon; a discount certificate; a price guarantee; a package/upgrade voucher; a group discount voucher; a multiple "for the price of one" offer/voucher; and or any other advertisement and/or marketing device designed to encourage some form of consumer action and/or inaction, as defined herein, and/or known in the art at the time of filing, and/or as developed after the time of filing.

In one embodiment, the same user interface is used by the advertisement and/or marketing device provider to provide both the at least one advertisement eligibility criterion and the advertisement and/or marketing device offer data to process for providing advertising to select consumers using payroll data.

In one embodiment, data representing financial information about the given consumer is obtained by process for providing advertising to select consumers using payroll data from one or more payroll systems, and/or one or more payroll services, and/or one or more computing system implemented payroll management systems, as defined herein, and/or known in the art at the time of filing, and/or as developed thereafter.

In one embodiment, using the data representing financial information about the given consumer obtained from a payroll system, and/or payroll service, and the data representing the at least one advertisement eligibility criterion, one or more advertisement and/or marking devices are identified that the given consumer is eligible to receive. In one embodiment, the advertisement and/or marking device provider is then provided access to the given consumer, either by providing the advertisement and/or marking device provider contact information for the given consumer, or through the process for providing advertising to select consumers using payroll data from one or more payroll systems, and/or one or more payroll services, and/or one or more computing system implemented payroll management systems, as defined herein, and/or known in the art at the time of filing, and/or as developed thereafter. In one embodiment, the given consumer is provided the one or more advertisements and/or marketing devices, and/or advertisements and/or marketing device offer data, through the payroll system and/or payroll service as a printed attachment to the given consumer's paycheck. In one embodiment, the given consumer is provided the one or more advertisements and/or marketing devices, and/or advertisement and/or marketing device offer data, through the payroll system and/or payroll service as an electronic attachment to the given consumer's paycheck data in a payroll account and/or listing associated with the given consumer.

Using the method and system for providing advertising to select consumers using payroll data disclosed herein, an advertisement and/or marketing device provider is given the ability to distribute advertisements and/or marketing devices to select consumers who meet the advertisement and/or marketing device eligibility criteria defined by the advertisement and/or marketing device provider, efficiently and relatively easily. Consequently, using the method and system for providing advertising to select consumers using payroll data disclosed herein, an advertisement and/or marketing device provider is given the ability to maximize the impressions of a given advertisement and/or marketing device made to a particularly desirable, and/or relevant, consumer.

Using the method and system for providing advertising to select consumers using payroll data disclosed herein, consumers meeting the advertisement and/or marketing device eligibility criteria are identified using data representing financial information about a given consumer obtained from a payroll system and/or payroll service, in one embodiment, as obtained using a computing system implemented payroll management system. Therefore, using the method and system for providing advertising to select consumers using payroll data disclosed herein, consumers meeting the advertisement and/or marketing device eligibility criteria are identified based on more accurate data than is typically currently available.

In addition, in one embodiment, the advertisement and/or marketing device provider enters data representing the at least one advertisement eligibility criterion, and the advertisement and/or marketing device offer itself, through a single user interface and then the advertisements and/or marketing devices are automatically distributed to eligible consumers. Consequently, using the method and system for providing advertising to select consumers using payroll data disclosed herein, the advertisements and/or marketing device providers are able to target select consumers based on more complete and accurate information, and provide those eligible consumers one or more advertisements and/or marketing devices automatically, without the need for further action on the part of the advertisement and/or marketing device provider. As a result, not only are the advertisement and/or marketing device providers given the ability to identify and target particularly desirable consumers easily, but the desirable consumers are also provided savings that would likely not be provided to them absent the method and system for providing advertising to select consumers using payroll data disclosed herein.

BRIEF DESCRIPTION OF THE DRAWINGS

FIG. 3 shows one embodiment of a user interface display including an advertisement eligibility criterion data entry and advertisement and/or marketing device offer fields, in accordance with one embodiment.

Figure 1:
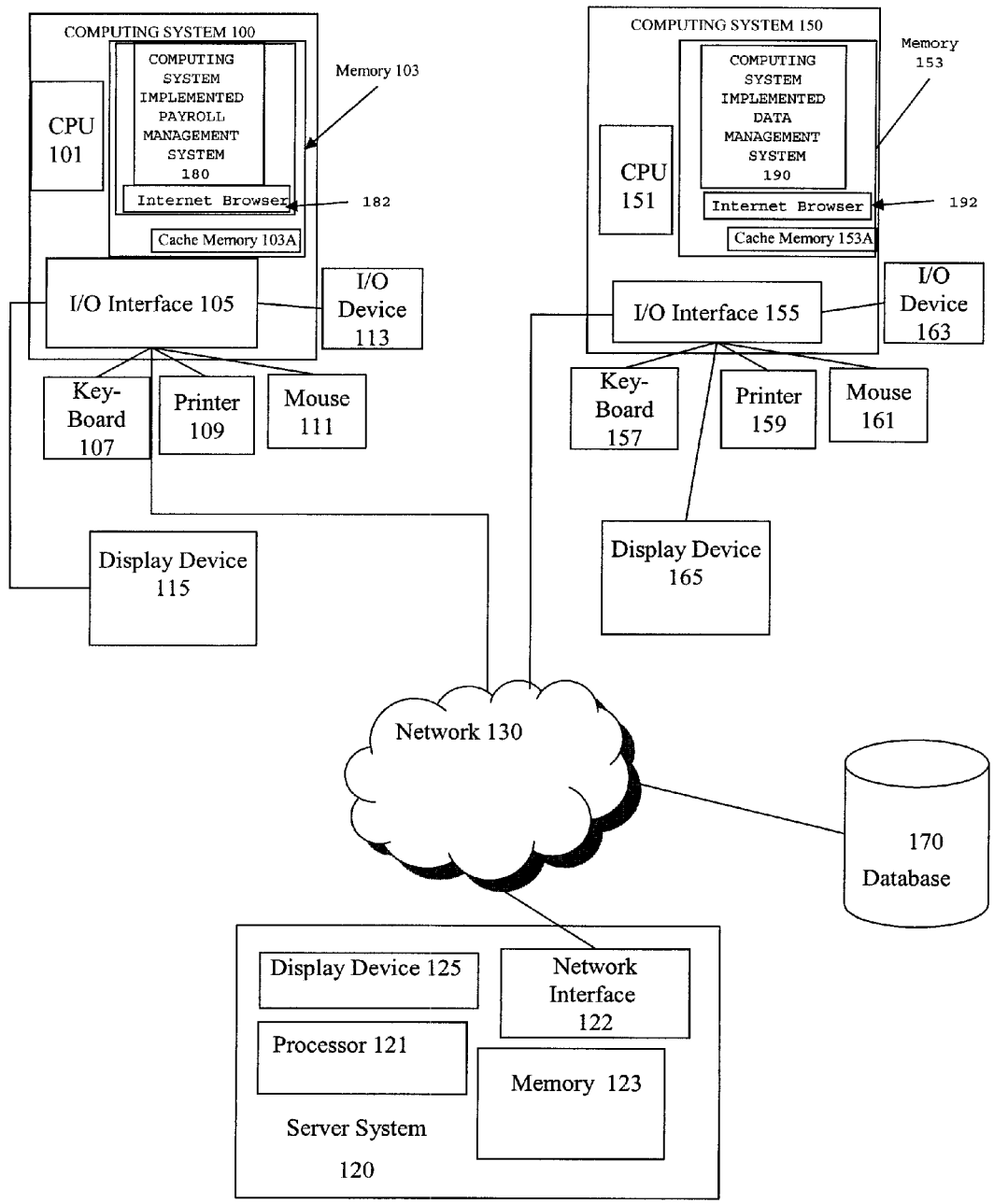
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing advertising to select consumers using payroll data includes a process for providing advertising to select consumers using payroll data whereby one or more advertisements and/or marketing devices are distributed to a given consumer based, at least in part, on data representing financial information about the given consumer obtained from a payroll system and/or payroll service. In one embodiment, a given consumer having one or more defined attributes as determined from their payroll data is identified and access to the given consumer is provided to one or more advertisement and/or marketing device providers. In one embodiment, the one or more advertisements and/or marketing devices are distributed to the given consumer through the payroll system and/or payroll service and, in one embodiment, the one or more advertisements and/or marketing devices are distributed to the given consumer as printed and/or electronic attachments to the given consumer's paycheck and/or payroll account.

Hardware System Architecture

FIG. 1 is a block diagram of an exemplary hardware architecture for implementing one embodiment of a system and method for providing advertising to select consumers using payroll data, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented payroll management system 180 such as any computing system implemented payroll management system defined herein, and/or known in the art at the time of filing, and/or as developed thereafter. In one embodiment, computing system implemented payroll management system 180 is stored, in whole, or in part, in memory system 103, and is used by, or includes, or is accessed by, a process for providing advertising to select consumers using payroll data.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing advertising to select consumers using payroll data and/or a computing system implemented payroll management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data representing financial information about one or more consumers and/or data representing one or more advertisements and/or marketing devices, in one or more formats, is stored, in whole, or in part, in memory system 103, and is used by, or is accessed by, a process for providing advertising to select consumers using payroll data and/or one or more consumers. In one embodiment, computing system 100 is a computing system accessible by one or more consumers and/or users. In one embodiment, computing system 100 is used, and/or accessible, by another computing system, such as computing system 150 (discussed below).

In one embodiment, computing system 100 is used, controlled, and/or accessible by, a payroll system, and/or payroll service, a provider of and/or a computing system implemented payroll management system and data representing financial information about one or more consumers obtained from a payroll system and/or payroll service is stored in computing system 100, typically in accounts associated with a given consumer.

Computing system 100 can be any computing system as defined herein and/or as known in the art at the time of filing and/or as developed thereafter, that includes components that can execute all, or part, of a process for providing advertising to select consumers using payroll data, and/or a computing system implemented payroll management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, a process for providing advertising to select consumers using payroll data.

In one embodiment, data representing financial information about one or more consumers obtained from a payroll system, and/or payroll service, and/or data representing one or more advertisements and/or marketing devices, in one or more formats, is stored, in whole, or in part, in memory system 153, and is used by, or is accessed by, a process for providing advertising to select consumers using payroll data and/or one or more consumers. In one embodiment, computing system 150 is a computing system accessible by one or more payroll systems and/or services, advertisement and/or marketing device providers, consumers, and/or users. In one embodiment, computing system 150 is used, and/or accessible, by another computing system, such as computing system 100.

In one embodiment, computing system 150 is used, controlled, and/or accessible by, a provider of and/or a computing system implemented data management system and data representing financial information about one or more consumers obtained from a payroll system and/or payroll service is stored in computing system 150, typically in accounts associated with a given consumer.

Computing system 150 can be any computing system as defined herein and/or as known in the art at the time of filing and/or as developed thereafter, that includes components that can execute all, or part, of a process for providing advertising to select consumers using payroll data, and/or a computing system implemented data management system, and/or a computing system implemented payroll management system, in accordance with at least one of the embodiments as described herein.

As discussed in more detail below, in one embodiment, all, or part, of a process for providing advertising to select consumers using payroll data, and/or a computing system implemented data management system, and/or a computing system implemented payroll management system, and/or data representing financial information about one or more consumers obtained from a payroll system and/or payroll service, and/or data representing one or more advertisements and/or marketing devices, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a given consumer and/or user, and/or one or more agents for a given consumer and/or user, and/or a process for providing advertising to select consumers using payroll data, and/or one or more payroll systems and/or services, and/or a computing system implemented data management system, and/or a computing system implemented payroll management system.

In one embodiment, all, or part, of a process for providing advertising to select consumers using payroll data, and/or a computing system implemented data management system, and/or a computing system implemented payroll management system, and/or data representing financial information about one or more consumers obtained from a payroll system and/or payroll service, and/or data representing one or more advertisements and/or marketing devices, is stored in database 170, and is used by, or is accessed by, a process for providing advertising to select consumers using payroll data. In one embodiment, database 170 is accessible by one or more payroll systems and/or services, advertisement and/or marketing device providers, consumers, and/or users. In one embodiment, database 170 is used, and/or accessible, by a computing system, such as computing systems 100 and/or 150, and/or a server system, such as sever system 120 (discussed below).

In one embodiment, database 170 is used, controlled, and/or accessible by, a provider of and/or a computing system implemented data management system.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, all, or part, of a process for providing advertising to select consumers using payroll data, and/or a computing system implemented data management system, and/or a computing system implemented payroll management system, and/or data representing financial information about one or more consumers obtained from a payroll system and/or payroll service, and/or data representing one or more advertisements and/or marketing devices, is stored in server system 120, and is used by, or is accessed by, a process for providing advertising to select consumers using payroll data. In one embodiment, server system 120 is accessible by one or more payroll systems and/or services, advertisement and/or marketing device providers, consumers, and/or users. In one embodiment, server system 120 is used, and/or accessible, by a computing system, such as computing systems 100 and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, all, or part, of a process for providing advertising to select consumers using payroll data, and/or a computing system implemented data management system, and/or a computing system implemented payroll management system, and/or data representing financial information about one or more consumers obtained from a payroll system and/or payroll service, and/or data representing one or more advertisements and/or marketing devices, is stored in memory system 103 and/or cache memory 103A, of computing system 100, and/or memory system 153 and/or cache memory 153A of computing system 150, and/or in server memory system 123 of server system 120, and/or in database 170, and executed on computing system 100 and/or computing system 150. As used herein, a memory refers to a volatile memory, a non-volatile memory, or any combination of the two.

Although a process for providing advertising to select consumers using payroll data, and/or a computing system implemented payroll management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing advertising to select consumers using payroll data and/or a computing system implemented payroll management system and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, all, or part, of a process for providing advertising to select consumers using payroll data, and/or a computing system implemented data management system, and/or a computing system implemented payroll management system, and/or data representing financial information about one or more consumers obtained from a payroll system and/or payroll service, and/or data representing one or more advertisements and/or marketing devices, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "advertisement" includes, but is not limited to, any advertisement and/or marketing device in printed, digital, text, visual, audio, or other format presented, and/or offered to, and/or obtained by, a consumer and/or a consumer's agents and designed to encourage some form of consumer action.

Herein, the term "marketing device" includes, but is not limited to: coupons; discount certificates; price guarantees; package/upgrade vouchers; group discount vouchers; multiple "for the price of one" offers/vouchers; advertisements; sales offers; and/or any other marketing tool and/or device and/or offer that is presented, and/or offered to, and/or obtained by, a consumer and/or a consumer's agents and is designed to encourage some form of consumer action.

Herein, the term "electronic media based advertisement and/or marketing device" is used to denote any advertisement and/or marketing device distributed primarily, and/or initially, as electronic data by any method and/or mechanism for distributing electronic media based advertisements and/or marketing devices as discussed herein, and/or as known in the art at the time of filing, and/or as developed/made available after the time of filing.

Herein, the term "consumer", denotes any person, party, user, business, and/or entity that receives, is a potential recipient of, is a potential target of, or is a potential intended recipient of, an advertisement and/or marketing device from any source of an advertisement and/or marketing device, and/or an authorized agent of any person, party, user, business, and/or entity that receives, is a potential recipient of, is a potential target of, or is a potential intended recipient of, an advertisement and/or marketing device from any source of an advertisement and/or marketing device, and/or any system and/or application acting on behalf of any person, party, user, business, and/or entity that receives, is a potential recipient of, is a potential target of, or is a potential intended recipient of, an advertisement and/or marketing device from any source of an advertisement and/or marketing device.

Herein the term "advertisement and/or marketing device provider" and "seller" are used interchangeably and include, but are not limited to, any person, party, user, business, and/or entity that distributes an advertisement and/or marketing device, and/or causes an advertisement and/or marketing device to be distributed, and/or for whom an advertisement and/or marketing device is distributed by any other person, party, user, business, and/or entity.

As used herein, the terms "payroll system" and "payroll service" includes, but is not limited to, any system, service, person, party, user, business, and/or entity, including, but not limited to, a computing system implemented payroll management system, that provides payroll and/or tax withholding service and/or whereby payroll and/or tax withholding service information is entered, stored, processed, and/or displayed to any other system, service, person, party, user, business, and/or entity.

As used herein, the term "computing system", denotes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented personal and small business financial management systems, packages, programs, modules, or applications; computing system implemented business systems, packages, programs, modules, or applications; computing system implemented payroll management systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "computing system implemented payroll management system" includes, but is not limited to, computing system implemented payroll management systems, packages, programs, modules, or applications, whereby payroll and/or tax withholding information is entered, stored, processed, and/or displayed to any system, service, person, party, user, business, and/or entity.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, and/or known at the time of filing, and/or as developed thereafter.

In accordance with one embodiment, a system and method for providing advertising to select consumers using payroll data includes a process for providing advertising to select consumers using payroll data whereby one or more advertisements and/or marketing devices are distributed to a given consumer based, at least in part, on data representing financial information about the given consumer obtained from a payroll system and/or payroll service. In one embodiment, a given consumer having one or more defined attributes as determined from their payroll data is identified and access to the given consumer is provided to one or more advertisement and/or marketing device providers. In one embodiment, the one or more advertisements and/or marketing devices are distributed to the given consumer through the payroll system and/or payroll service and, in one embodiment, the one or more advertisements and/or marketing devices are distributed to the given consumer as printed and/or electronic attachments to the given consumer's paycheck and/or payroll account.

Figure 2:
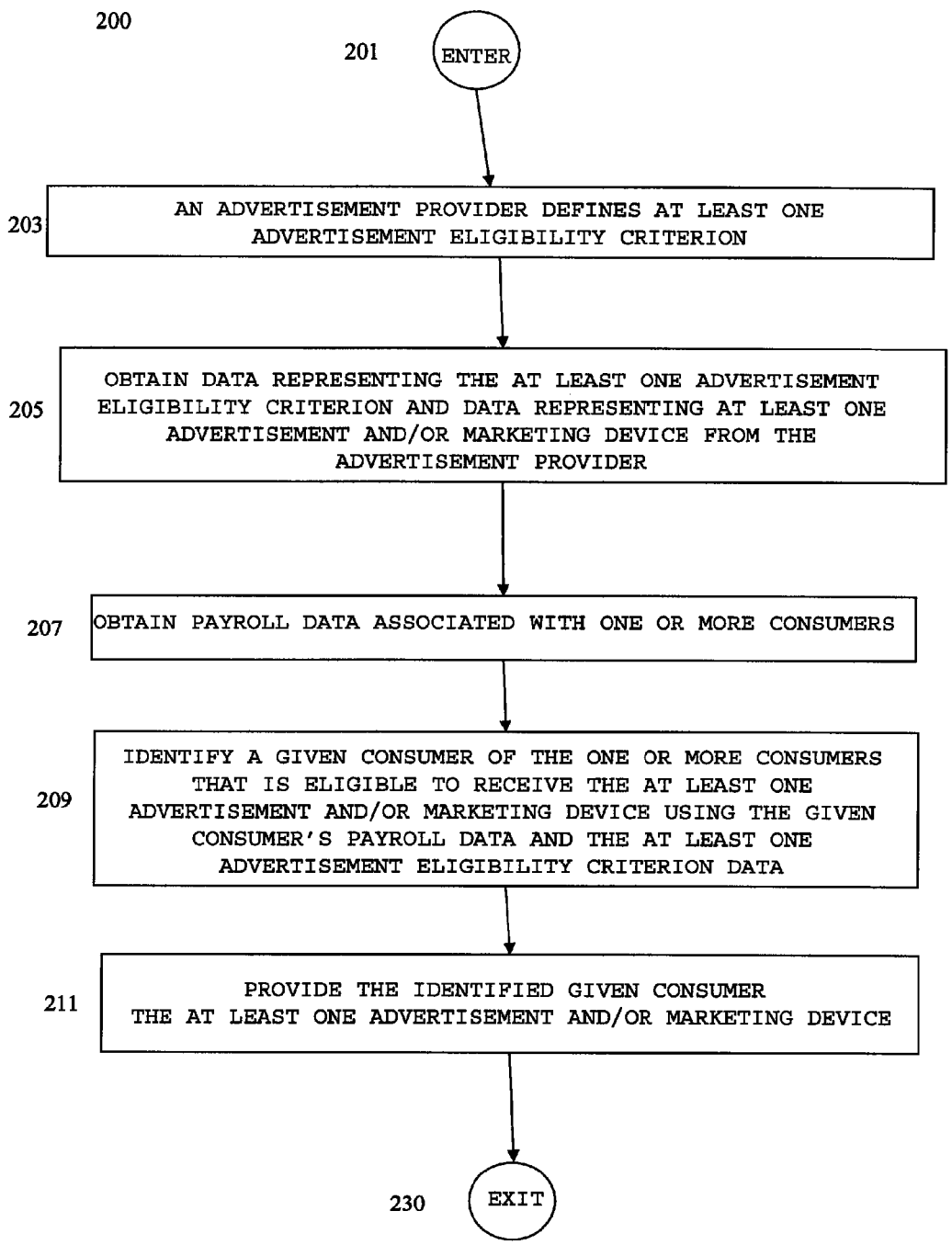
FIG. 2 is a flow chart depicting a process for providing advertising to select consumers using payroll data in accordance with one embodiment.

FIG. 2 a flow chart depicting a process for providing advertising to select consumers using payroll data 200 in accordance with one embodiment. Process for providing advertising to select consumers using payroll data 200 begins at ENTER OPERATION 201 of FIG. 2 and process flow proceeds to AN ADVERTISEMENT PROVIDER DEFINES AT LEAST ONE ADVERTISEMENT ELIGIBILITY CRITERION OPERATION 203.

In one embodiment, at AN ADVERTISEMENT PROVIDER DEFINES AT LEAST ONE ADVERTISEMENT ELIGIBILITY CRITERION OPERATION 203 an advertisement and/or marketing device provider defines at least one advertisement eligibility criterion that must be met by a consumer in order for the consumer to be eligible to receive one or more advertisements and/or marketing devices.

In one embodiment, an advertisement and/or marketing device provider defines at least one advertisement eligibility criterion at AN ADVERTISEMENT PROVIDER DEFINES AT LEAST ONE ADVERTISEMENT ELIGIBILITY CRITERION OPERATION 203 in order to target select consumers having characteristics the advertisement and/or marketing device provider finds particularly desirable or particularly relevant to one or more selected advertisements and/or marketing devices. In one embodiment, virtually any criteria can be defined by the advertisement and/or marketing device provider that is typically identifiable from payroll data.

For instance, in one embodiment, the advertisement and/or marketing device provider defined eligibility criteria can include, but is not limited to, the eligibility criterion that eligible consumers must have recently received a bonus. As discussed below, using process for providing advertising to select consumers using payroll data this criterion can be readily established based on a given consumer's payroll data.

As one example where the advertisement and/or marketing device provider defined eligibility criterion that eligible consumers must have recently received a bonus is useful is in the case where the advertisement and/or marketing device provider is a seller of luxury and/or relatively non-essential products and/or services. In this instance, an eligible consumer may be more likely to consider the advertisers' product given his or her recent unexpected income.

As another example, in one embodiment, the advertisement and/or marketing device provider defined eligibility criteria can include, but is not limited to, the eligibility criterion that eligible consumers must have a threshold amount of accrued vacation time. As discussed below, using process for providing advertising to select consumers using payroll data this criterion can be readily established based on a given consumer's payroll data.

As one example where the advertisement and/or marketing device provider defined eligibility criterion that eligible consumers must have a threshold amount of accrued vacation time is useful is in the case where the advertisement and/or marketing device provider is a seller of vacation related products and/or services.

As another example, in one embodiment, the advertisement and/or marketing device provider defined eligibility criteria can include, but is not limited to, the eligibility criterion that eligible consumers must have recently increased their dependent withholding status by at least one. As discussed below, using process for providing advertising to select consumers using payroll data this criterion can be readily established based on a given consumer's payroll data.

As one example where the advertisement and/or marketing device provider defined eligibility criterion that eligible consumers must have recently increased their dependent withholding status by at least one is useful is in the case where the advertisement and/or marketing device provider is a seller of baby and/or newlywed related products and/or services.

As another example, in one embodiment, the advertisement and/or marketing device provider defined eligibility criteria can include, but is not limited to, the eligibility criterion that eligible consumers must have a defined income and/or a threshold or cutoff income level. As discussed below, using process for providing advertising to select consumers using payroll data this criterion can be readily established based on a given consumer's payroll data, including the given consumer's gross and/or net pay.

As one example where the advertisement and/or marketing device provider defined eligibility criterion that eligible consumers must have a defined income and/or a threshold or cutoff income level is useful is in the case where the advertisement and/or marketing device provider is a seller of high-end products and/or services. In this instance, the advertisement and/or marketing device provider/seller will typically be interested in targeting select consumers who have a threshold income, for instance $100,000.00 a year or more. Consequently, as discussed in more detail below, using the advertisement and/or marketing device provider defined eligibility criterion that eligible consumers must have a defined income and/or a threshold income level, the advertisement and/or marketing device provider/seller can use payroll data to avoid "wasting" advertising resources on lower income consumers who would not be likely to use their product and/or service.

As another example where the advertisement and/or marketing device provider defined eligibility criterion that eligible consumers must have a defined income and/or a threshold or cutoff income level is useful is in the case where the advertisement and/or marketing device provider is a seller of products and/or services that are typically not of interest to higher income consumers. In this instance, the advertisement and/or marketing device provider/seller will typically be interested in targeting select consumers who have a cutoff income, for instance $50,000.00 a year or less. Consequently, as discussed in more detail below, using the advertisement and/or marketing device provider defined eligibility criterion that eligible consumers must have a defined income and/or a cutoff income level, the advertisement and/or marketing device provider/seller can use payroll data to avoid "wasting" advertising resources on higher income consumers who would not be likely to use their product and/or service.

In another instance, in one embodiment, the advertisement and/or marketing device provider defined eligibility criteria can include, but is not limited to, the eligibility criterion that eligible consumers must have a threshold number of claimed exemptions for tax withholding from their pay, thereby indicating a threshold number of dependents. As discussed below, using process for providing advertising to select consumers using payroll data this criterion can be readily established based on a given consumer's payroll data, including the given consumer's claimed dependent exemptions and/or withholdings.

As one example where the advertisement and/or marketing device provider defined eligibility criterion that eligible consumers must have a must have a threshold number of claimed exemptions is useful is in the case where the advertisement and/or marketing device provider is a seller of family related products. In this instance, the advertisement and/or marketing device provider/seller will typically be interested in targeting select consumers who have a threshold number of claimed exemptions, indicating a threshold number of dependents, for instance two or more. Consequently, as discussed in more detail below, using the advertisement and/or marketing device provider defined eligibility criterion that eligible consumers must have a threshold number of claimed exemptions; the advertisement and/or marketing device provider/seller can use payroll data to potentially avoid "wasting" advertising resources on single consumers who would not be likely to use their product and/or service.

As another example, in one embodiment, the advertisement and/or marketing device provider defined eligibility criteria can include, but is not limited to, the criterion that eligible consumers must live or work within a specified distance of the advertisement and/or marketing device provider's store, and/or other designated location. As discussed below, using process for providing advertising to select consumers using payroll data this criterion can be readily established based on a given consumer's payroll data, including the given consumer's home address and/or work address data.

As one example where the advertisement and/or marketing device provider defined eligibility criterion that eligible consumers must live or work within a specified distance of the advertisement and/or marketing device provider's store is useful is when the advertisement and/or marketing device provider is developing a neighborhood-based and/or repeat local customer base. As an example, a café, dry cleaner, gym, or other neighborhood service related business advertisement and/or marketing device provider might find this eligibility criterion very attractive. Consequently, as discussed in more detail below, using the advertisement and/or marketing device provider defined eligibility criterion that eligible consumers must live or work within a specified distance of the advertisement and/or marketing device provider's store, the advertisement and/or marketing device provider/business can use payroll data to avoid "wasting" advertising resources on non-local consumers who would not be likely to use their product and/or service.

As another example, in one embodiment, the advertisement and/or marketing device provider defined eligibility criteria can include, but is not limited to, the eligibility criterion that eligible consumers must meet one or more economic and social demographics. Using this criterion the advertisement and/or marketing device provider can target select consumers who are likely to yield a desired return on the investment and may have special, or increased, interest in one or more of the advertisement and/or marketing device provider's products and/or services.

In other examples, the advertisement and/or marketing device provider defined eligibility criteria can include, but is not limited to: consumer's participating, or not participating, in an employer-sponsored retirement plan, consumer's having, or not having, various forms of insurance; consumer's having flex spending and threshold balances in their flex spending accounts, or any other eligibility criteria as defined by the advertisement and/or marketing device provider.

The specific advertisement and/or marketing device provider defined eligibility criteria discussed above are but a few specific examples of possible advertisement and/or marketing device provider defined eligibility criteria. In other embodiments, any other criterion, or combination of criteria, considered desirable by an advertisement and/or marketing device provider, and that can be determined based on payroll data, can be defined at AN ADVERTISEMENT PROVIDER DEFINES AT LEAST ONE ADVERTISEMENT ELIGIBILITY CRITERION OPERATION 203.

In one embodiment, once an advertisement and/or marketing device provider defines at least one advertisement eligibility criterion that must be met by a consumer in order for the consumer to be eligible to receive one or more advertisements and/or marketing devices at AN ADVERTISEMENT PROVIDER DEFINES AT LEAST ONE ADVERTISEMENT ELIGIBILITY CRITERION OPERATION 203, process flow proceeds to OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

In one embodiment, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205, data representing the at least one advertisement eligibility criterion of AN ADVERTISEMENT PROVIDER DEFINES AT LEAST ONE ADVERTISEMENT ELIGIBILITY CRITERION OPERATION 203, and advertisement and/or marketing device offer data describing the advertisement and/or marketing device offer and/or other advertisement and/or marketing device information, is provided to process for providing advertising to select consumers using payroll data 200.

In one embodiment, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205, data representing the at least one advertisement eligibility criterion of AN ADVERTISEMENT PROVIDER DEFINES AT LEAST ONE ADVERTISEMENT ELIGIBILITY CRITERION OPERATION 203 and/or the advertisement and/or marketing device offer data is provided to process for providing advertising to select consumers using payroll data 200, either directly, or through a computing system implemented data management system that implements, includes, is accessible by, and/or is otherwise associated with, process for providing advertising to select consumers using payroll data 200.

As noted above, in one embodiment, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 the advertisement and/or marketing device provider provides advertisement and/or marketing device offer data to process for providing advertising to select consumers using payroll data 200. In one embodiment the advertisement and/or marketing device offer data includes, but is not limited to: the terms of the marketing device, such as any discount/price offered, any expiration data, any conditions and/or minimum purchase amounts, etc.; contact information for the advertisement and/or marketing device provider, such as an address, phone number, e-mail address, web-site, etc; and, optionally, a logo and/or trademark associated with the advertisement and/or marketing device provider.

In one embodiment, the advertisement and/or marketing device provider provides the data representing the at least one advertisement eligibility criterion and the advertisement and/or marketing device offer data to process for providing advertising to select consumers using payroll data 200 via a user interface on a computing system display, such as computing system display device 115 of computing system 100 of FIG. 1, and a user interface device, such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, access to the data representing the at least one advertisement eligibility criterion and/or advertisement and/or marketing device offer data is provided to process for providing advertising to select consumers using payroll data 200 at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 by providing process for providing advertising to select consumers using payroll data 200, and/or a computing system implemented data management system associated with process for providing advertising to select consumers using payroll data 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, access to the data representing the at least one advertisement eligibility criterion and/or advertisement and/or marketing device offer data is provided to process for providing advertising to select consumers using payroll data 200, and/or a computing system implemented data management system associated with process for providing advertising to select consumers using payroll data 200, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, access to the data representing the at least one advertisement eligibility criterion and/or advertisement and/or marketing device offer data is provided to process for providing advertising to select consumers using payroll data 200, and/or a computing system implemented data management system associated with process for providing advertising to select consumers using payroll data 200, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 through e-mail or through text messaging.

In one embodiment, access to the data representing the at least one advertisement eligibility criterion and/or advertisement and/or marketing device offer data is provided to process for providing advertising to select consumers using payroll data 200, and/or a computing system implemented data management system associated with process for providing advertising to select consumers using payroll data 200, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, the given advertisement and/or marketing device of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 can be, but is not limited to: a printed advertisement; a text message advertisement; a video advertisement; and audio advertisement; an e-mail advertisement; a pop-up advertisement; a coupon; a discount certificate; a price guarantee; a package/upgrade voucher; a group discount voucher; a multiple "for the price of one" offer/voucher; and or any other advertisement and/or marketing device designed to encourage some form of consumer action and/or inaction, as defined herein, and/or known in the art at the time of filing, and/or as developed after the time of filing.

As noted above, in one embodiment, at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205, the advertisement and/or marketing device provider provides the data representing the at least one advertisement eligibility criterion and the advertisement and/or marketing device offer data to process for providing advertising to select consumers using payroll data 200 via a user interface and a user interface device, such as defined herein, known in the art at the time of filing, or as developed thereafter. FIG. 3 shows one specific example of a user interface display 300 that could be used by the advertisement and/or marketing device provider to provide the data representing the at least one advertisement eligibility criterion and the advertisement and/or marketing device offer data to process for providing advertising to select consumers using payroll data 200 (FIG. 2) via a user interface device at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

Returning to FIG. 3, user interface display 300 includes: advertisement and/or marketing device eligibility criteria section 301; advertisement and/or marketing device offer data section 311; and logo/trademark section 321.

As seen in FIG. 3, in this one example, advertisement and/or marketing device eligibility criteria section 301 includes: number of people field 303 where the advertisement and/or marketing device provider can define the maximum number of recipients and/or a maximum number of impressions of the advertisement and/or marketing device in order to control costs; advertisement eligibility criterion field 305 that, in this specific example, includes the advertisement eligibility criterion of the eligible consumers having accrued vacation time of more than 40 hours.

As also seen in FIG. 3, in this specific example, advertisement and/or marketing device offer data section 311 indicates that the advertisement and/or marketing device is good for "20% off of all Hawaii vacations" as indicated in advertisement and/or marketing device terms field 313. As also seen in FIG. 3, in this specific example, the advertisement and/or marketing device provider has not elected to upload and attach his or her logo at logo/trademark section 321.

Using user interface display 300, or any similar user interface display in accordance with one embodiment of process for providing advertising to select consumers using payroll data 200 (FIG. 2), an advertisement and/or marketing device provider can, in one embodiment, define an advertisement eligibility criterion, and define the advertisement and/or marketing device itself, through a single user interface that is simple to understand and does not involve sifting through hundreds, if not thousands, of keyword possibilities and other parameters that are typically associated with currently available electronic advertisement and/or marketing device distribution and marketing means. Consequently, using user interface display 300 (FIG. 3), or a similar user interface display in accordance with one embodiment of process for providing advertising to select consumers using payroll data 200 (FIG. 2), an advertisement and/or marketing device provider does not need to have sophisticated search engine skills, nor does he or she need to devote significant resources, training, or time, to defining a given advertisement and/or marketing device or to defining eligible consumer criteria. This makes user interface display 300 (FIG. 3), or a similar user interface display in accordance with one embodiment of process for providing advertising to select consumers using payroll data 200 (FIG. 2), particularly attractive to small and/or new business advertisement and/or marketing device providers.

Returning to FIG. 3, those of skill in the art will readily recognize that the choice of information displayed, the organization of the information displayed, and the manner in which the information is displayed in FIG. 3 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

In one embodiment, once data representing the at least one advertisement eligibility criterion and/or the advertisement and/or marketing device offer is provided to process for providing advertising to select consumers using payroll data 200 at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205, process flow proceeds to OBTAIN PAYROLL DATA ASSOCIATED WITH ONE OR MORE CONSUMERS OPERATION 207.

In one embodiment, at OBTAIN PAYROLL DATA ASSOCIATED WITH ONE OR MORE CONSUMERS OPERATION 207 payroll data associated with one or more consumers is obtained from one or more payroll systems, payroll services, or similar sources.

In one embodiment, the payroll data associated with one or more consumers is obtained by process for providing advertising to select consumers using payroll data 200 at OBTAIN PAYROLL DATA ASSOCIATED WITH ONE OR MORE CONSUMERS OPERATION 207 from one or more computing system implemented payroll management systems, such as computing system implemented payroll management system 180 of FIG. 1, and/or as defined herein, and/or known in the art at the time of filing, and/or as developed thereafter. Currently, various computing system implemented payroll management systems are available as standalone applications, web-based applications, systems, packages, programs, and/or modules.

Returning to FIG. 2, in one embodiment, the payroll data associated with one or more consumers obtained by process for providing advertising to select consumers using payroll data 200 at OBTAIN PAYROLL DATA ASSOCIATED WITH ONE OR MORE CONSUMERS OPERATION 207 includes, but is not limited to: a given consumer's name; a given consumer's home address; a given consumer's work address; a given consumer accrued vacation time; a given consumer's income; bonuses recently paid to the given consumer; a given consumer's marital status; the number of dependent exemptions claimed by a given consumer and/or changes to the number of dependent exemptions claimed by a given consumer; and various other financial and/or demographic data associated with a given consumer.

In one embodiment, at OBTAIN PAYROLL DATA ASSOCIATED WITH ONE OR MORE CONSUMERS OPERATION 207, a given consumer must agree to share his or her payroll data with process for providing advertising to select consumers using payroll data.

In one embodiment, the payroll data associated with one or more consumers is obtained using one or more computing system implemented data management systems and the data is then transferred, or otherwise made available to, process for providing advertising to select consumers using payroll data 200 at OBTAIN PAYROLL DATA ASSOCIATED WITH ONE OR MORE CONSUMERS OPERATION 207.

In one embodiment, once the payroll data associated with one or more consumers is obtained by process for providing advertising to select consumers using payroll data 200 at OBTAIN PAYROLL DATA ASSOCIATED WITH ONE OR MORE CONSUMERS OPERATION 207, the payroll data associated with one or more consumers is stored in whole, or in part, in a database maintained by, accessible by, owned by, or otherwise related to: process for providing advertising to select consumers using payroll data 200, and/or a provider of process for providing advertising to select consumers using payroll data 200; a computing system implemented payroll management system, and/or a provider of a computing system implemented payroll management system; a computing system implemented data management system, and/or a provider of a computing system implemented data management system; one or more advertisement and/or marketing device providers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the payroll data associated with one or more consumers obtained by process for providing advertising to select consumers using payroll data 200 at OBTAIN PAYROLL DATA ASSOCIATED WITH ONE OR MORE CONSUMERS OPERATION 207, stored as described above, is maintained, in whole, or in part, by: process for providing advertising to select consumers using payroll data 200, and/or a provider of process for providing advertising to select consumers using payroll data 200; a computing system implemented payroll management system, and/or a provider of a computing system implemented payroll management system; a computing system implemented data management system, and/or a provider of a computing system implemented data management system; one or more advertisement and/or marketing device providers; a third party data storage institution; any third party service or institution; or any other parties. In these embodiments, access to the payroll data associated with one or more consumers obtained by process for providing advertising to select consumers using payroll data 200 at OBTAIN PAYROLL DATA ASSOCIATED WITH ONE OR MORE CONSUMERS OPERATION 207 is then provided to process for providing advertising to select consumers using payroll data 200, and/or a computing system implemented data management system, by providing access to the data and/or providing the data on a computer program product.

In one embodiment, once the payroll data associated with one or more consumers is obtained by process for providing advertising to select consumers using payroll data 200 at OBTAIN PAYROLL DATA ASSOCIATED WITH ONE OR MORE CONSUMERS OPERATION 207, process flow proceeds to IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209.

In one embodiment at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 the payroll data associated with one or more consumers of OBTAIN PAYROLL DATA ASSOCIATED WITH ONE OR MORE CONSUMERS OPERATION 207 and the data representing the at least one advertisement eligibility criterion of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 is used to identify/determine a given consumer of the one or more consumers of OBTAIN PAYROLL DATA ASSOCIATED WITH ONE OR MORE CONSUMERS OPERATION 207 that is that is eligible to receive the at least one advertisement and/or marketing device of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

In one embodiment, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 the payroll data associated with one or more consumers of OBTAIN PAYROLL DATA ASSOCIATED WITH ONE OR MORE CONSUMERS OPERATION 207 and the data representing the at least one advertisement eligibility criterion of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 is analyzed to match and/or identify the given consumer eligible to receive the at least one advertisement and/or marketing device using any one of numerous matching procedures, processes, methods, means, and/or mechanisms, well known in the art for analyzing, and/or processing, and/or comparing, and/or matching two sets of data.

As noted above, in some embodiments, the payroll data associated with one or more consumers obtained by process for providing advertising to select consumers using payroll data 200 at OBTAIN PAYROLL DATA ASSOCIATED WITH ONE OR MORE CONSUMERS OPERATION 207 includes, but is not limited to: a given consumer's name; a given consumer's home address; a given consumer's work address; a given consumer accrued vacation time; a given consumer's income; how frequently the given consumer is paid by the employer; bonuses recently paid to the given consumer; a given consumer's marital status; the number of dependent exemptions claimed by a given consumer and/or changes to the number of dependent exemptions claimed by a given consumer; and various other financial and/or demographic data associated with a given consumer. Consequently, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 any, or all, of the above information can be matched with the data representing the at least one advertisement eligibility criterion of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 to identify one or more consumers eligible to receive the at least one marketing device.

For instance, as noted above, in one embodiment, the advertisement and/or marketing device provider defined eligibility criteria can include, but is not limited to, the eligibility criterion that eligible consumers must have recently received a bonus. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data, including the given consumer's gross and/or net pay data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

As another example, as noted above, in one embodiment, the advertisement and/or marketing device provider defined eligibility criteria can include, but is not limited to, the eligibility criterion that eligible consumers must have a threshold amount of accrued vacation time. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

As another example, as noted above, in one embodiment, the advertisement and/or marketing device provider defined eligibility criteria can include, but is not limited to, the eligibility criterion that eligible consumers must have recently increased their dependent withholding status by at least one. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

As another example, as noted above, in one embodiment, the advertisement and/or marketing device provider defined eligibility criteria can include, but is not limited to, the eligibility criterion that eligible consumers must have a defined income and/or a threshold or cutoff income level. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data, including the given consumer's gross and/or net pay data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

In another instance, as noted above, in one embodiment, the advertisement and/or marketing device provider defined eligibility criteria can include, but is not limited to, the eligibility criterion that eligible consumers must have a threshold number of claimed exemptions for tax withholding from their pay, thereby indicating a threshold number of dependents. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data, including the given consumer's claimed dependent exemptions data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

As another example, as noted above, in one embodiment, the advertisement and/or marketing device provider defined eligibility criteria can include, but is not limited to, the criterion that eligible consumers must live or work within a specified distance of the advertisement and/or marketing device provider's store, and other designated location. Using process for providing advertising to select consumers using payroll data 200, at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 this criterion can be readily established based on a given consumer's payroll data, including the given consumer's home address and/or work address data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

As another example, as noted above, in one embodiment, the advertisement and/or marketing device provider defined eligibility criteria can include, but is not limited to, the eligibility criterion that eligible consumers must meet various economic and social demographics. Using process for providing advertising to select consumers using payroll data 200 at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 these criterion can typically be established based on a given consumer's payroll data obtained at OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

The specific examples discussed above are but a few specific examples of the numerous possible ways of using/processing the payroll data associated with one or more consumers obtained by process for providing advertising to select consumers using payroll data 200 at OBTAIN PAYROLL DATA ASSOCIATED WITH ONE OR MORE CONSUMERS OPERATION 207 and the data representing the at least one advertisement eligibility criterion of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 to identify a given consumer eligible to receive the at least one advertisement and/or marketing device of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205.

In one embodiment once the payroll data associated with one or more consumers of OBTAIN PAYROLL DATA ASSOCIATED WITH ONE OR MORE CONSUMERS OPERATION 207, and the data representing the at least one advertisement eligibility criterion of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205, is used to identify/determine a given consumer of the one or more consumers of OBTAIN PAYROLL DATA ASSOCIATED WITH ONE OR MORE CONSUMERS OPERATION 207 that is that is eligible to receive the at least one advertisement and/or marketing device of OBTAIN DATA REPRESENTING THE AT LEAST ONE ADVERTISEMENT ELIGIBILITY CRITERION AND DATA REPRESENTING AT LEAST ONE ADVERTISEMENT AND/OR MARKETING DEVICE FROM THE ADVERTISEMENT PROVIDER OPERATION 205 at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209, process flow proceeds to PROVIDE THE IDENTIFIED GIVEN CONSUMER THE AT LEAST ONE ADVERTISEMENT AND/OR MARKETING DEVICE OPERATION 211.

In one embodiment, at PROVIDE THE IDENTIFIED GIVEN CONSUMER THE AT LEAST ONE ADVERTISEMENT AND/OR MARKETING DEVICE OPERATION 211 the given consumer is provided the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by providing the advertisement and/or marketing device provider contact information for the given consumer and then the advertisement and/or marketing device provider supplying the advertisement and/or marketing device, or data representing the advertisement and/or marketing device, to the given consumer directly.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by providing the advertisement and/or marketing device provider contact information for the given consumer and then the advertisement and/or marketing device provider supplying the advertisement and/or marketing device, or data representing the advertisement and/or marketing device, to the given consumer through postal service In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by providing the advertisement and/or marketing device provider access to the given consumer through a computing system implemented data management system and then the advertisement and/or marketing device provider supplying the advertisement and/or marketing device, or data representing the advertisement and/or marketing device, to the given consumer through the computing system implemented data management system.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by providing the advertisement and/or marketing device provider access to the given consumer through a payroll system and then the advertisement and/or marketing device provider supplying the advertisement and/or marketing device, or data representing the advertisement and/or marketing device, to the given consumer through the payroll system.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by storing data representing the advertisement and/or marketing device and then providing the given consumer access to the marketing device, either directly or through a payroll service, and/or a payroll system, and/or a computing system implemented payroll management system, and/or a computing system implemented data system.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 by transferring data representing the given advertisement and/or marketing device to the given consumer, either directly or through a payroll service, and/or a payroll system, and/or a computing system implemented payroll management system, and/or a computing system implemented data system.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 through a network of computing systems and/or server systems as defined herein, either directly or through a payroll service, and/or a payroll system, and/or a computing system implemented payroll management system, and/or a computing system implemented data system.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 through e-mail or through text messaging either directly or through a payroll service, and/or a payroll system, and/or a computing system implemented payroll management system, and/or a computing system implemented data system.

As noted above, in one embodiment, at PROVIDE THE IDENTIFIED GIVEN CONSUMER THE AT LEAST ONE ADVERTISEMENT AND/OR MARKETING DEVICE OPERATION 211, the given consumer is provided access to the the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 through the payroll service, payroll system, and/or computing system implemented payroll management system that provided the payroll data associated with one or more consumers to process for providing advertising to select consumers using payroll data 200 at OBTAIN PAYROLL DATA ASSOCIATED WITH ONE OR MORE CONSUMERS OPERATION 207.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 through the payroll service, payroll system, and/or computing system implemented payroll management system that provided the payroll data associated with one or more consumers to process for providing advertising to select consumers using payroll data 200 at OBTAIN PAYROLL DATA ASSOCIATED WITH ONE OR MORE CONSUMERS OPERATION 207 as a printed attachment to the given consumer's paycheck.

In one embodiment, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 through the payroll service, payroll system, and/or computing system implemented payroll management system that provided the payroll data associated with one or more consumers to process for providing advertising to select consumers using payroll data 200 at OBTAIN PAYROLL DATA ASSOCIATED WITH ONE OR MORE CONSUMERS OPERATION 207 as an electronic attachment to the given consumer's paycheck data in a payroll account and/or listing associated with the given consumer in the payroll system, and/or the payroll service, and/or a computing system implemented payroll management system.

In some embodiments, at PROVIDE THE IDENTIFIED GIVEN CONSUMER THE AT LEAST ONE ADVERTISEMENT AND/OR MARKETING DEVICE OPERATION 211, the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 automatically by any of the methods discussed herein once the given consumer is identified at IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209, in one embodiment, without any further action being required by the advertisement and/or marketing device provider.

In one embodiment, once the given consumer is provided access to the at least one advertisement and/or marketing device of IDENTIFY A GIVEN CONSUMER OF THE ONE OR MORE CONSUMERS THAT IS ELIGIBLE TO RECEIVE THE AT LEAST ONE ADVERTISEMENT AND/OR MARKETING DEVICE USING THE GIVEN CONSUMER'S PAYROLL DATA AND THE AT LEAST ONE ADVERTISEMENT ELIGIBILITY CRITERION DATA OPERATION 209 at PROVIDE THE IDENTIFIED GIVEN CONSUMER THE AT LEAST ONE ADVERTISEMENT AND/OR MARKETING DEVICE OPERATION 211, process flow proceeds to EXIT OPERATION 230. In one embodiment, at EXIT OPERATION 230, process for providing advertising to select consumers using payroll data 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing advertising to select consumers using payroll data 200, an advertisement and/or marketing device provider is given the ability to distribute advertisements and/or marketing devices to select consumers who meet the advertisement eligibility criteria defined by the advertisement and/or marketing device provider, efficiently and relatively easily. Consequently, using process for providing advertising to select consumers using payroll data 200, an advertisement and/or marketing device provider is given the ability to maximize the impressions of a given advertisement and/or marketing device made to a particularly desirable, and/or relevant, consumer.

Using process for providing advertising to select consumers using payroll data 200, consumers meeting the advertisement eligibility criteria are identified using data representing financial information about a given consumer obtained from a payroll system and/or payroll service, in one embodiment, as obtained using a computing system implemented payroll management system. Therefore, using process for providing advertising to select consumers using payroll data 200, consumers meeting the advertisement and/or marketing device eligibility criteria are identified based on more accurate data than is typically currently available.

In addition, in one embodiment, the advertisement and/or marketing device provider enters data representing the at least one advertisement eligibility criterion, and the advertisement and/or marketing device offer itself, through a single user interface and then the advertisements and/or marketing devices are automatically distributed to eligible consumers. Consequently, using one embodiment of process for providing advertising to select consumers using payroll data 200, the advertisement and/or marketing device providers are able to target select consumers based on more complete and accurate information, and provide those eligible consumers one or more advertisements and/or marketing devices automatically, without the need for further action on the part of the advertisement and/or marketing device provider. As a result, not only are the advertisement and/or marketing device providers given the ability to identify and target particularly desirable consumers easily, but the desirable consumers are also provided savings that would likely not be provided to them absent process for providing advertising to select consumers using payroll data 200.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "creating", "defining", "analyzing", "obtaining", "identifying", "associating", "aggregating"; "initiating"; "collecting", "proposing", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus, means, or system for performing the operations described herein. This apparatus, means, or system may be specifically constructed for the required purposes, or the apparatus, means, or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of networks, are defined herein, operating over numerous topologies.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of various embodiments include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing advertising to select consumers using payroll data comprising:
    obtaining data representing at least one advertisement eligibility criterion that a consumer must meet in order to be eligible to receive a given advertisement from an advertisement provider, the process being operable to consider each of the following advertisement eligibility criterion if associated with a given advertisement:
        the criterion that the eligible consumers must have a threshold number of accrued vacation hours;
        the criterion that the eligible consumers must have at least a threshold balance in their flex spending account;
        the criterion that the eligible consumers must have recently been paid a bonus;
        the criterion that the eligible consumers must have recently been given a pay raise;
        the criterion that the eligible consumers must have recently added a dependent tax exemption;
        the criterion that the eligible consumers must have an income within a defined range of income;
        the criterion that the eligible consumers must have an income greater than a threshold income;
        the criterion that the eligible consumers must have an income less than a cutoff income;
        the criterion that the eligible consumers must claim a threshold number of dependent tax exemptions;
    obtaining data representing the given advertisement offer from the advertisement provider;
    obtaining one or more consumers' payroll data, the one or more consumers' payroll data representing financial information about the one or more consumers obtained from a payroll system;
    analyzing one or more consumers' payroll data and the data representing the at least one advertisement eligibility criterion to identify one or more eligible consumers, of the one or more consumers, eligible to receive the given advertisement; and
    providing the one or more eligible consumer's access to the given advertisement.

2. The computing system implemented process for providing advertising to select consumers using payroll data of claim 1, wherein;
    the payroll system is a computing system implemented payroll management system.

3. The computing system implemented process for providing advertising to select consumers using payroll data of claim 1, wherein;
    the payroll system is a third party payroll service.

4. The computing system implemented process for providing advertising to select consumers using payroll data of claim 1, wherein;
    at least part of the one or more consumers' payroll data includes payroll data selected from the group of payroll data consisting of:
    a given consumer's accrued vacation time;
    bonuses received by the given consumer;
    how frequently the given consumer is paid by an employer;
    a given consumer's name;
    a given consumer's home address;
    a given consumer's work address;
    a given consumer's income;
    a given consumer's marital status;
    the number of dependent exemptions claimed by a given consumer;
    financial data associated with a given consumer; and
    demographic data associated with a given consumer.

5. The computing system implemented process for providing advertising to select consumers using payroll data of claim 1, wherein;
    obtaining data representing at least one advertisement eligibility criterion that a consumer must meet in order to be eligible to receive a given advertisement from an advertisement provider comprises:
    obtaining data representing at least one advertisement eligibility criterion that a consumer must meet in order to be eligible to receive a given advertisement from the advertisement provider by the advertisement provider entering data representing the at least one advertisement eligibility criterion through a user interface on a display screen of a computing system using a user interface device.

6. The computing system implemented process for providing advertising to select consumers using payroll data of claim 1, wherein;
    obtaining data representing the given advertisement offer from the advertisement provider comprises:
    obtaining data representing the given advertisement offer from the advertisement provider by the advertisement provider entering data representing the given advertisement offer through a user interface on a display screen of a computing system using a user interface device.

7. The computing system implemented process for providing advertising to select consumers using payroll data of claim 1, wherein;
    obtaining data representing at least one advertisement eligibility criterion that a consumer must meet in order to be eligible to receive a given advertisement from an advertisement provider comprises:
    obtaining data representing at least one advertisement eligibility criterion that a consumer must meet in order to be eligible to receive a given advertisement from the advertisement provider by the advertisement provider entering data representing the at least one advertisement eligibility criterion through a user interface on a display screen of a computing system using a user interface device, further wherein;

obtaining data representing the given advertisement offer from the advertisement provider comprises:

obtaining data representing the given advertisement offer from the advertisement provider by the advertisement provider entering data representing the given advertisement offer through the same user interface on the display screen of the computing system using a user interface device.

8. The computing system implemented process for providing advertising to select consumers using payroll data of claim 1, wherein;

providing the one or more eligible consumer's access to the given advertisement comprises:

providing at least one advertisement provider access information for at least one of the one or more eligible consumers.

9. The computing system implemented process for providing advertising to select consumers using payroll data of claim 1, wherein;

providing the one or more eligible consumer's access to the given advertisement comprises:

attaching the given advertisement to at least one of the one or more eligible consumer's paycheck.

10. The computing system implemented process for providing advertising to select consumers using payroll data of claim 1, wherein;

providing the one or more eligible consumer's access to the given advertisement comprises:

attaching the given advertisement to at least one of the one or more eligible consumer's direct deposit notice.

11. The computing system implemented process for providing advertising to select consumers using payroll data of claim 1, wherein;

providing the one or more eligible consumer's access to the given advertisement comprises:

including data representing the given advertisement in a payroll account associated with at least one of the one or more eligible consumer's in the payroll system.

12. The computing system implemented process for providing advertising to select consumers using payroll data of claim 1, wherein;

providing the one or more eligible consumer's access to the given advertisement comprises:

including data representing the given advertisement in a payroll account associated with at least one of the one or more eligible consumer's in a computing system implemented payroll management system.

13. The computing system implemented process for providing advertising to select consumers using payroll data of claim 1, wherein;

providing the one or more eligible consumer's access to the given advertisement comprises:

storing data representing the given advertisement and providing at least one of the one or more eligible consumers access to the data representing given advertisement.

14. The computing system implemented process for providing advertising to select consumers using payroll data of claim 1, wherein;

providing the one or more eligible consumer's access to the given advertisement comprises:

transferring data representing the given advertisement to a computing system accessible by at least one of the one or more eligible consumers.

15. A computer program product for providing a process for providing advertising to select consumers using payroll data comprising:

a computer readable medium;

and computer program code, encoded on the computer readable medium, comprising computer readable instructions for:

obtaining data representing at least one advertisement eligibility criterion that a consumer must meet in order to be eligible to receive a given advertisement from an advertisement provider, the process being operable to consider each of the following advertisement eligibility criterion if associated with a given advertisement:

the criterion that the eligible consumers must have a threshold number of accrued vacation hours;

the criterion that the eligible consumers must have at least a threshold balance in their flex spending account;

the criterion that the eligible consumers must have recently been paid a bonus;

the criterion that the eligible consumers must have recently been given a pay raise;

the criterion that the eligible consumers must have recently added a dependent tax exemption;

the criterion that the eligible consumers must have an income within a defined range of income;

the criterion that the eligible consumers must have an income greater than a threshold income;

the criterion that the eligible consumers must have an income less than a cutoff income;

the criterion that the eligible consumers must claim a threshold number of dependent tax exemptions;

obtaining data representing the given advertisement offer from the advertisement provider;

obtaining one or more consumers' payroll data, the one or more consumers' payroll data representing financial information about the one or more consumers obtained from a payroll system;

analyzing one or more consumers' payroll data and the data representing the at least one advertisement eligibility criterion to identify one or more eligible consumers, of the one or more consumers, eligible to receive the given advertisement; and providing the one or more eligible consumer's access to the given advertisement.

16. The computer program product for providing a process for providing advertising to select consumers using payroll data of claim 15, wherein;

the payroll system is a computing system implemented payroll management system.

17. The computer program product for providing a process for providing advertising to select consumers using payroll data of claim 15, wherein;

the payroll system is a third party payroll service.

18. The computer program product for providing a process for providing advertising to select consumers using payroll data of claim 15, wherein;

at least part of the one or more consumers' payroll data includes payroll data selected from the group of payroll data consisting of:

a given consumer's accrued vacation time;

bonuses received by the given consumer;

how frequently the given consumer is paid by an employer;

a given consumer's name;

a given consumer's home address;

a given consumer's work address;

a given consumer's income;

a given consumer's marital status;

the number of dependent exemptions claimed by a given consumer;

financial data associated with a given consumer; and demographic data associated with a given consumer.

19. The computer program product for providing a process for providing advertising to select consumers using payroll data of claim 15, wherein;

obtaining data representing at least one advertisement eligibility criterion that a consumer must meet in order to be eligible to receive a given advertisement from an advertisement provider comprises:

obtaining data representing at least one advertisement eligibility criterion that a consumer must meet in order to be eligible to receive a given advertisement from the advertisement provider by the advertisement provider entering data representing the at least one advertisement eligibility criterion through a user interface on a display screen of a computing system using a user interface device.

20. The computer program product for providing a process for providing advertising to select consumers using payroll data of claim 15, wherein;

obtaining data representing the given advertisement offer from the advertisement provider comprises:

obtaining data representing the given advertisement offer from the advertisement provider by the advertisement provider entering data representing the given advertisement offer through a user interface on a display screen of a computing system using a user interface device.

21. The computer program product for providing a process for providing advertising to select consumers using payroll data of claim 15, wherein;

obtaining data representing at least one advertisement eligibility criterion that a consumer must meet in order to be eligible to receive a given advertisement from an advertisement provider comprises:

obtaining data representing at least one advertisement eligibility criterion that a consumer must meet in order to be eligible to receive a given advertisement from the advertisement provider by the advertisement provider entering data representing the at least one advertisement eligibility criterion through a user interface on a display screen of a computing system using a user interface device, further wherein;

obtaining data representing the given advertisement offer from the advertisement provider comprises:

obtaining data representing the given advertisement offer from the advertisement provider by the advertisement provider entering data representing the given advertisement offer through the same user interface on the display screen of the computing system using a user interface device.

22. The computer program product for providing a process for providing advertising to select consumers using payroll data of claim 15, wherein;

providing the one or more eligible consumer's access to the given advertisement comprises:

providing at least one of the one or more eligible consumers access to the given advertisement automatically once the at least one of the eligible consumer is identified.

23. The computer program product for providing a process for providing advertising to select consumers using payroll data of claim 15, wherein;

providing the one or more eligible consumer's access to the given advertisement comprises:

attaching the given advertisement to at least one of the one or more eligible consumer's paycheck.

24. The computer program product for providing a process for providing advertising to select consumers using payroll data of claim 15, wherein;

providing the one or more eligible consumer's access to the given advertisement comprises:

attaching the given advertisement to at least one of the one or more eligible consumer's direct deposit notice.

25. The computer program product for providing a process for providing advertising to select consumers using payroll data of claim 15, wherein;

providing the one or more eligible consumer's access to the given advertisement comprises:

including data representing the given advertisement in a payroll account associated with at least one of the one or more eligible consumer's in the payroll system.

26. The computer program product for providing a process for providing advertising to select consumers using payroll data of claim 15, wherein;

providing the one or more eligible consumer's access to the given advertisement comprises:

including data representing the given advertisement in a payroll account associated with at least one of the one or more eligible consumer's in a computing system implemented payroll management system.

27. The computer program product for providing a process for providing advertising to select consumers using payroll data of claim 15, wherein;

providing the one or more eligible consumer's access to the given advertisement comprises:

storing data representing the given advertisement and providing at least one of the one or more eligible consumers access to the data representing given advertisement.

28. The computer program product for providing a process for providing advertising to select consumers using payroll data of claim 15, wherein;

providing the one or more eligible consumer's access to the given advertisement comprises:

transferring data representing the given advertisement to a computing system accessible by at least one of the one or more eligible consumers.

* * * * *

UNITED STATES PATENT AND TRADEMARK OFFICE
CERTIFICATE OF CORRECTION

| | | |
|---|---|---|
| PATENT NO. | : 8,060,403 B1 | Page 1 of 1 |
| APPLICATION NO. | : 12/182348 | |
| DATED | : November 15, 2011 | |
| INVENTOR(S) | : Lesley Kim Grossblatt et al. | |

It is certified that error appears in the above-identified patent and that said Letters Patent is hereby corrected as shown below:

In the Claims

In Column 32, Line 1, Claim 1, replace "consumer's" with --consumers--;
In Column 33, Line 15, Claim 8, replace "consumer's" with --consumers--;
In Column 33, Line 23, Claim 9, replace "consumer's" with --consumers--;
In Column 33, Line 30, Claim 10, replace "consumer's" with --consumers--;
In Column 33, Line 37, Claim 11, replace "consumer's" with --consumers--;
In Column 33, Line 41, Claim 11, replace "consumer's" with --consumers--;
In Column 33, Line 45, Claim 12, replace "consumer's" with --consumers--;
In Column 33, Line 49, Claim 12, replace "consumer's" with --consumers--;
In Column 33, Line 54, Claim 13, replace "consumer's" with --consumers--;
In Column 33, Line 58, Claim 13, before "given advertisement", insert --the--;
In Column 33, Line 62, Claim 14, replace "consumer's" with --consumers--;
In Column 34, Line 44, Claim 15, replace "consumer's" with --consumers--;
In Column 36, Line 1, Claim 22, replace "consumer's" with --consumers--;
In Column 36, Line 9, Claim 23, replace "consumer's" with --consumers--;
In Column 36, Line 16, Claim 24, replace "consumer's" with --consumers--;
In Column 36, Line 23, Claim 25, replace "consumer's" with --consumers--;
In Column 36, Line 27, Claim 25, replace "consumer's" with --consumers--;
In Column 36, Line 31, Claim 26, replace "consumer's" with --consumers--;
In Column 36, Line 35, Claim 26, replace "consumer's" with --consumers--;
In Column 36, Line 40, Claim 27, replace "consumer's" with --consumers--;
In Column 36, Line 44, Claim 27, before "given advertisement", insert --the--; and
In Column 36, Line 48, Claim 28, replace "consumer's" with --consumers--.

Signed and Sealed this
Twenty-fifth Day of March, 2014

Michelle K. Lee
*Deputy Director of the United States Patent and Trademark Office*